(12) United States Patent
Pul

(10) Patent No.: US 11,459,090 B2
(45) Date of Patent: Oct. 4, 2022

(54) V2 PPRW

(71) Applicant: George Pul, Las Vegas, NV (US)

(72) Inventor: George Pul, Las Vegas, NV (US)

( * ) Notice: Subject to any disclaimer, the term of this patent is extended or adjusted under 35 U.S.C. 154(b) by 264 days.

(21) Appl. No.: 16/984,105

(22) Filed: Aug. 3, 2020

(65) Prior Publication Data

US 2022/0033063 A1 Feb. 3, 2022

(51) Int. Cl.
*B64C 11/46* (2006.01)
*B64C 39/00* (2006.01)
*B64D 35/04* (2006.01)

(52) U.S. Cl.
CPC ............ *B64C 11/46* (2013.01); *B64C 39/005* (2013.01); *B64D 35/04* (2013.01)

(58) Field of Classification Search
CPC ........ B64C 11/46; B64C 39/005; B64D 35/04
See application file for complete search history.

(56) References Cited

U.S. PATENT DOCUMENTS

| | | | | |
|---|---|---|---|---|
| 1,780,580 A * | 11/1930 | Davis | .................... | B64C 39/008 244/23 R |
| 6,007,021 A * | 12/1999 | Tsepenyuk | .......... | B64C 29/0033 416/126 |
| 6,845,940 B2 * | 1/2005 | Hashimoto | ........... | B64C 39/008 244/19 |
| 10,774,807 B2 * | 9/2020 | Pul | ......................... | F03D 3/061 |
| 10,988,236 B2 * | 4/2021 | Pul | ........................ | B64C 11/006 |
| 2014/0048657 A1 * | 2/2014 | Lin | ..................... | B64C 29/0025 244/23 A |

* cited by examiner

*Primary Examiner* — Brian M O'Hara

(57) ABSTRACT

V2 Pipe Prop Rotary Wing (PPRW) incorporates a general PPRW documented in patent application Ser. No. 16/128,537 filed on Sep. 12, 2018; and both V2 PPRW and the general PPRW are each a propeller driven propulsion engine in a pipe profile with props or propellers rotating in part as rotary wings. V2 PPRW enhances propulsion performances through the shaping of fluid flow field patterns around props and by the increased relative fluid flow velocities between props of interacting planet and sun airfoils. V2 PPRW props in rotations propel directional fluid for thrusts of lift and drag forces transversely through and across the pipe along the length of the pipe; and when vectored, the thrust forces are turned into variable thrust forces for vehicles in air, on ground, and above or below water.

2 Claims, 3 Drawing Sheets

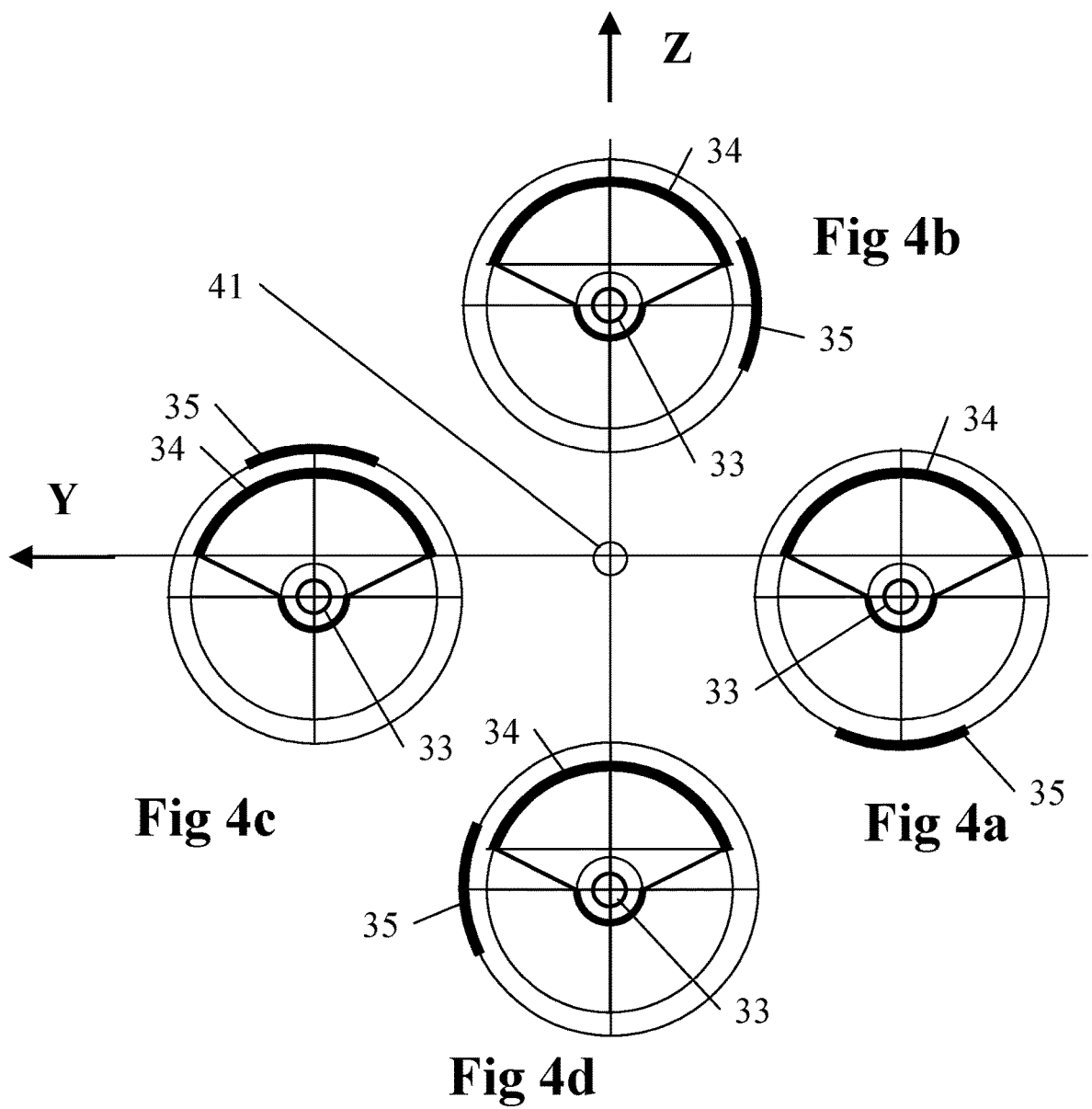

V2 PPRW

FIELD

The present invention of a V2 PPRW (Pipe Prop Rotary Wing) relates generally to props or propellers driven propulsion engines, and more particularly, the present invention relates to props driven propulsion engines in a pipe profile, with props rotating in part as rotary wings, and having both props and shafts oriented lengthwise along the pipe.

BACKGROUND OF THE INVENTION

V2 PPRW (Pipe Prop Rotary Wing) of the present invention is derived from and incorporates a general PPRW documented in patent application Ser. No. 16/128,537 filed on Sep. 12, 2018. V2 PPRW, like the general PPRW, is a propeller driven propulsion engine in a pipe profile with props or propellers rotating in part as rotary wings lengthwise along the pipes, and offers a unified propeller driven propulsion engines for all propeller driven aircrafts such as fixed wing aircrafts, rotary wing aircrafts or helicopters, and tilt rotor aircrafts. V2 PPRW has enhanced propulsion performances compared to the general PPRW by counter-rotating sun and planet airfoils for shaping airflow field patterns and changing relative airflow velocities around and between props of interacting planet and sun airfoils. V2 PPRW props in rotations, like the general PPRW, propels directional airflows for lift and drag forces for combined trust forces, transversely through, across, and along the length of the pipe; and when vectored, the propelled thrust forces are turned into variable thrust forces for an aircraft takeoffs, landings, and air flights.

SUMMARY OF THE INVENTION

V2 PPRW is derived from and incorporates a general PPRW documented in patent application Ser. No. 16/128, 537 filed on Sep. 12, 2018. V2 PPRW, like the general PPRW, is a propeller driven propulsion engine in a pipe profile with props or propellers rotating in part as rotary wings lengthwise along the pipes to propel directional air for lift and drag forces for combined thrust forces transversely through and across the pipe along the length of the pipe; and when vectored, the thrust forces are turned into variable thrust forces for an aircraft takeoffs, landings, and air flights. Unlike the general PPRW, the V2 PPRW is modified for greater propulsion performances by means of shaping contoured airflow field patterns and increased relative airflow velocities around and between props of interacting planet and sun airfoils, and comprising: a sun rotor main-assembly, orbited by a planet rotor main-assembly, and supported by an end mounting main-assembly.

The sun rotor main-assembly is consisted of a plurality of sun rotor sub-assemblies mounted on a pair of sun rotor end plates. The plurality of sun rotor sub-assemblies are clustered in proximity around and in rotations freely from each other, and the plurality of sun rotor sub-assemblies are all rotating in the same directions, either clockwise or counter-clockwise. Each of the plurality of sun rotor sub-assemblies in turn is consisted of one sun rotating shaft, a plurality of sun airfoils, and one sun drive sprockets. The sun rotating shaft and the plurality of sun airfoils are extended in between the sun rotor end plate, the sun rotating shaft continues to pass through and is mounted by free rotation joints to the sun rotor end plates, and the plurality of sun airfoils are fixed attached along and equally spaced in rotations with the sun rotating shaft. Further out from the pair of sun rotor end plates, the sun rotating shaft extends in between and fixed attached to the sun drive sprocket. Each of the plurality of sun airfoils in cross section has a curved segment in shape similar to a semi circle for a high drag sun airfoil with a semicircle chord lying on a radial line from the sun rotating shaft; the curved segment having a radius defined as $1.0*R$ with its concave surface rotating facing in the same direction in its rotations, pressured against the surrounding air for maximum air pressure resistance, and the sun airfoil in rotations has the appearance of rotational images of one another. Each of the plurality of sun rotor sub-assemblies has the appearance of pipes in profiles.

The planet rotor main-assembly is consisted of a plurality of orbiting planet rotor sub-assemblies mounted on a pair of planet rotating end carrier plates, with the plurality of orbiting planet rotor sub-assemblies equally spaced circumferentially and orbiting in counter-rotations freely in close proximity around the plurality of sun rotor sub-assemblies. Each of the plurality of orbiting planet rotor sub-assemblies in turn is consisted of a planet rotating shaft, a planet airfoil augmented by a paired flaperon, and a pair of planet drive sprockets. The planet rotating shaft, and the planet airfoil augmented by the paired flaperon extend in between the pair of planet rotating end carrier plates, the planet rotating shaft passes through and is fixed attached except by rotation joints to the planet rotating end carrier plates, the planet airfoil is fixed attached along and in rotations with the planet rotating shaft, and the paired flaperon is fixed attached to planet rotating end carrier plates. Further out from the pair of planet rotating end carrier plates, the planet rotating shaft extends in between and is fixed attached to the pair of drive sprocket. The planet airfoil has an appearance similar to a curved segment of a large portion of a semi-circle for a high lift and drag hybrid planet airfoil with a radius substantially greater than $1.0*R$ and a chord width substantially wider than the sun airfoil chord width, its concave surface persistently facing one direction, and the high lift and drag hybrid planet airfoil appearing as translational image of one another in orbital rotations. The paired flaperon has an appearance of a small portion of a semi-circle segment, nested in close proximity to and having nearly the same radius as the planet airfoil. The planet airfoil augmented by the paired flaperon are concentric in rotations for sharing the same planet rotating shaft as their curved segments centerline with the augmented paired flaperon retracting and deploying around the planet airfoil. The paired flaperon appear as rotational image of one another in rotations around the paired planet airfoil, and in orbital rotations around the sun airfoils of the sun rotor main-assembly. The planet rotor main-assembly and the plurality of orbiting planet rotor sub-assemblies have appearances as pipes in profiles.

The end mounting main-assembly id consisted of one stationary central shaft, one pair of grounding plates, and one pair of gear box and drive assemblies. The stationary central shaft extends in between, passes through, and is fixed attached to the pair of sun rotor end plates supporting the sun rotating shafts of the plurality of sun rotor sub-assemblies. Beyond the pair of sun rotor end plates, the stationary central shaft extends in between and passes through and is fixed attached except by rotational joints to the pair of planet rotating end carrier plates of the plurality of planet rotor sub-assemblies. Further beyond, the stationary central shaft extends in between and is fixed attached to the pair of grounding plates. The pair of gear box and drive assemblies are fixed mounted on and being an integral part of the stationary central shaft extending with the pair of gear box and drive assemblies in between and straddling across the pair of sun rotor end plate and the pair of grounding plate.

V2 PPRW is further comprised of a power and control system to set in motion through the pair of gear box and drive chain assemblies the sun drive sprockets and the planet drive sprockets of the V2 PPRW. Airflow patterns shaped by interacting sun and planet airfoils augmented by the paired flaperons are controlled by such means as flow gates, diverters, ducts, and funnels as appropriate. These and other systems and means and provisions required for the V2 PPRW are neither novel nor unique, and are not further described.

In operations, the V2 PPRW, a propeller driven propulsion engine, has the provided power transmissions and controls system, being powered, in setting in motion through the pair of gear box and drive chain assemblies the sun rotor main-assembly, orbited by the planet rotor main-assembly, and supported by the end mounting main-assembly. The high lift and drag hybrid planet airfoils augmented by the paired flaperons rotating with the plurality of orbiting planet rotor sub-assemblies are in counter-rotations freely around and interacting with the sun airfoils rotating with the plurality of sun rotor sub-assemblies. All sun airfoils rotating with the plurality of sun rotor sub-assemblies by themselves alone are wind generators in drawing in air flowing from the pipe ends and propelling the air radially and tangentially out of the pipe into a pattern of contoured swirling airflow velocity field surrounding the plurality of sun rotor sub-assemblies, producing rotational drag thrust forces only, but neither translational drag nor lift forces. The persistently facing orbiting high lift and drag hybrid planet airfoils augmented by the paired flaperons are counter-rotating at a given velocity in part as rotary wings transitioning through the pattern of contoured swirling airflow velocity field. The high lift and drag hybrid planet airfoils augmented by paired flaperons resultant relative airflow velocities are greatly increased for greatly amplified lift forces, while the resultant relative airflow velocity is greatly increased and decreased favoring for greatly amplified net drag forces aligned in the direction of the lift forces. The lift and drag forces are combined into thrust forces to propel in directions transversely through and across the pipe profile, when vectored, the thrust forces are turned into variable thrust forces. The V2 PPRW, with the planet airfoils augmented by paired flaperons rotating in part as rotary wings, is applicable for propeller propulsion to all propeller driven aircrafts, and as fixed wing replacements for fixed wing and tilt rotor aircrafts.

V2 PPRW, a propeller driven propulsion engine, produce great propulsion performances by shaping airflow fields of sun airfoils and changing relative velocities of interacting sun and planet airfoils. The propulsion performances are overwhelmingly dominated by the performances of high lift and drag hybrid planet airfoils, rotating in part as rotary wings, and having much larger planet airfoils orbiting at a much greater radius than sun airfoils in generating propelled air for lift and drag forces combined into thrust forces. Sun and planet airfoils, interacting in rotations, propel air for thrust forces transversely through and across the pipe profiles along the length of the V2 PPRW. When vectored, the total propelled thrust forces are turned into variable thrust forces for aircraft takeoffs, landings, and air flights.

BRIEF DESCRIPTION OF THE DRAWINGS

FIGS. 4a, b, c, and d are frontal schematic motion view of one orbiting planet rotor sub-assembly shown in FIG. 3.

DESCRIPTION OF THE PREFERRED EMBODIMENT

V2 Pipe Props Rotary Wing (PPRW) of the present invention, a prop driven propulsion engine in a pipe profile, is disclosed by a preferred embodiment, which is a simplified V2 PPRW to show with clarity its features and advantages for been powered to propel air for lift and drag forces combined into thrust forces. These and other features and advantages of the present invention will become more apparent to one skilled in the art from the following description and claims when read in light of the accompanying drawings for the preferred embodiment of a simplified present invention.

Unless otherwise apparent, or stated, directional references, such as "inner," "inward," "outer," "outward," "downward," "upper", "lower" etc., are for non-limiting descriptive purposes and intended to be relative to the orientation of a particular V2 PPRW of the present invention as shown in the view of that apparatus. Parts shown in a given FIGURE are generally proportional in their dimensions; parts shown or omitted in a given FIGURE are intended generally for clarity; and where appropriate, main- and sub-assemblies having general appearances of pipes are shown as pipes in profiles.

Given X-Y-Z coordinate system for the V2 PPRW, the +X axis points aft ward on the orbital rotation centerline of the planet rotor main-assembly, +Z axis up, and +Y axis is orthogonal to X-Z axes. V2 PPRW, a propeller driven propulsion engine in a pipe profile, has the pipe profile of the sun rotor main-assembly, orbited by the pipe profile of a planet rotor main-assembly, with the pipe profile oriented along the X axis.

Figure 1:
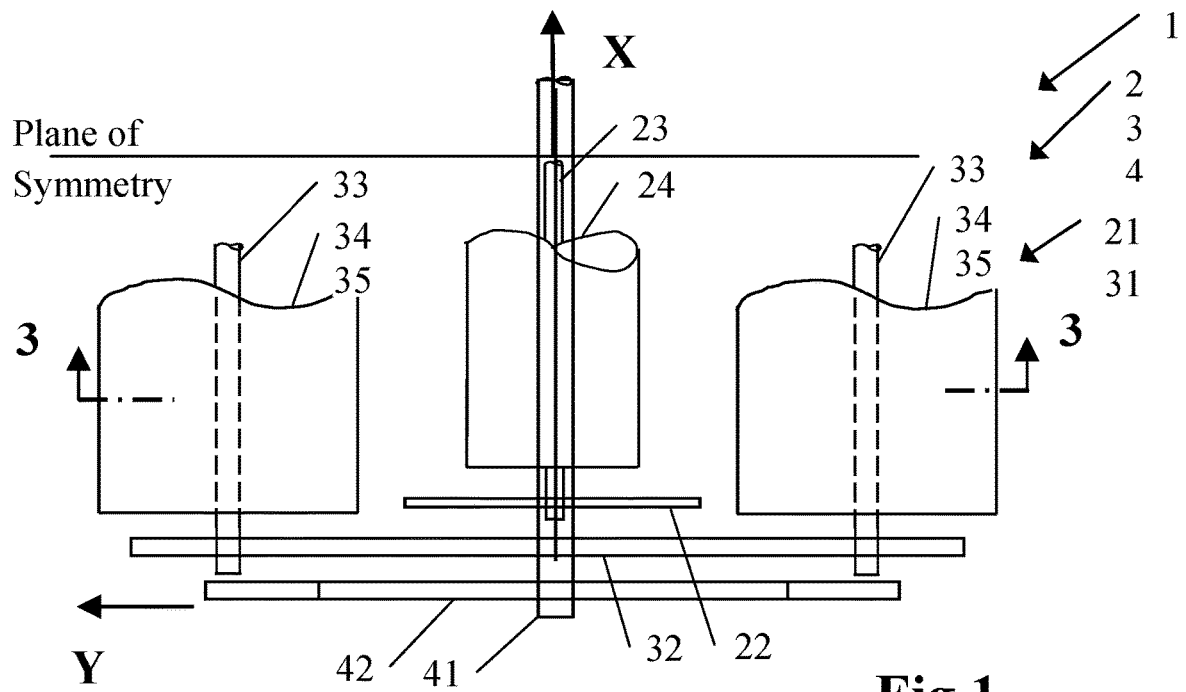
FIG. 1 is a plan view of the preferred embodiment of the present invention.
Figure 2:
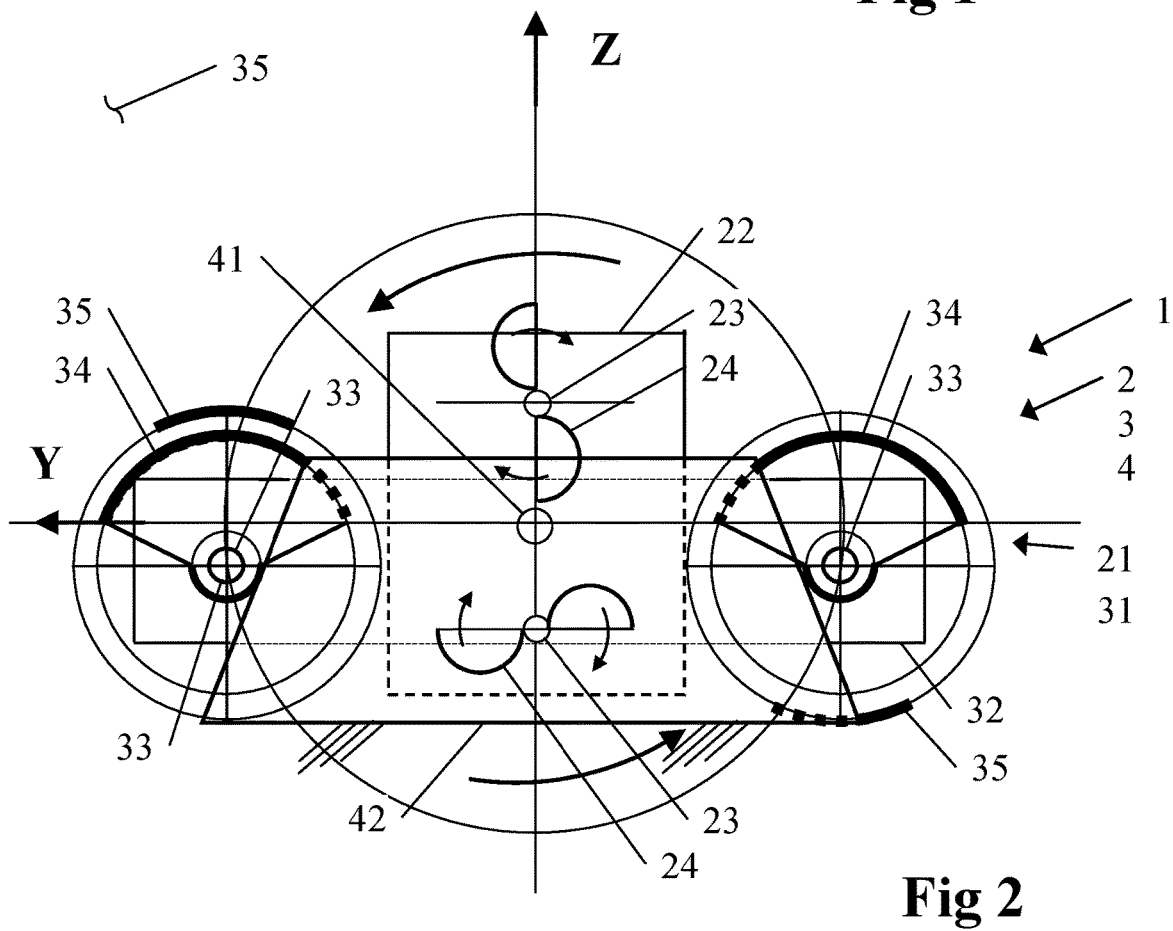
FIG. 2 is a front view of the preferred embodiment of the present invention.
Figure 3:
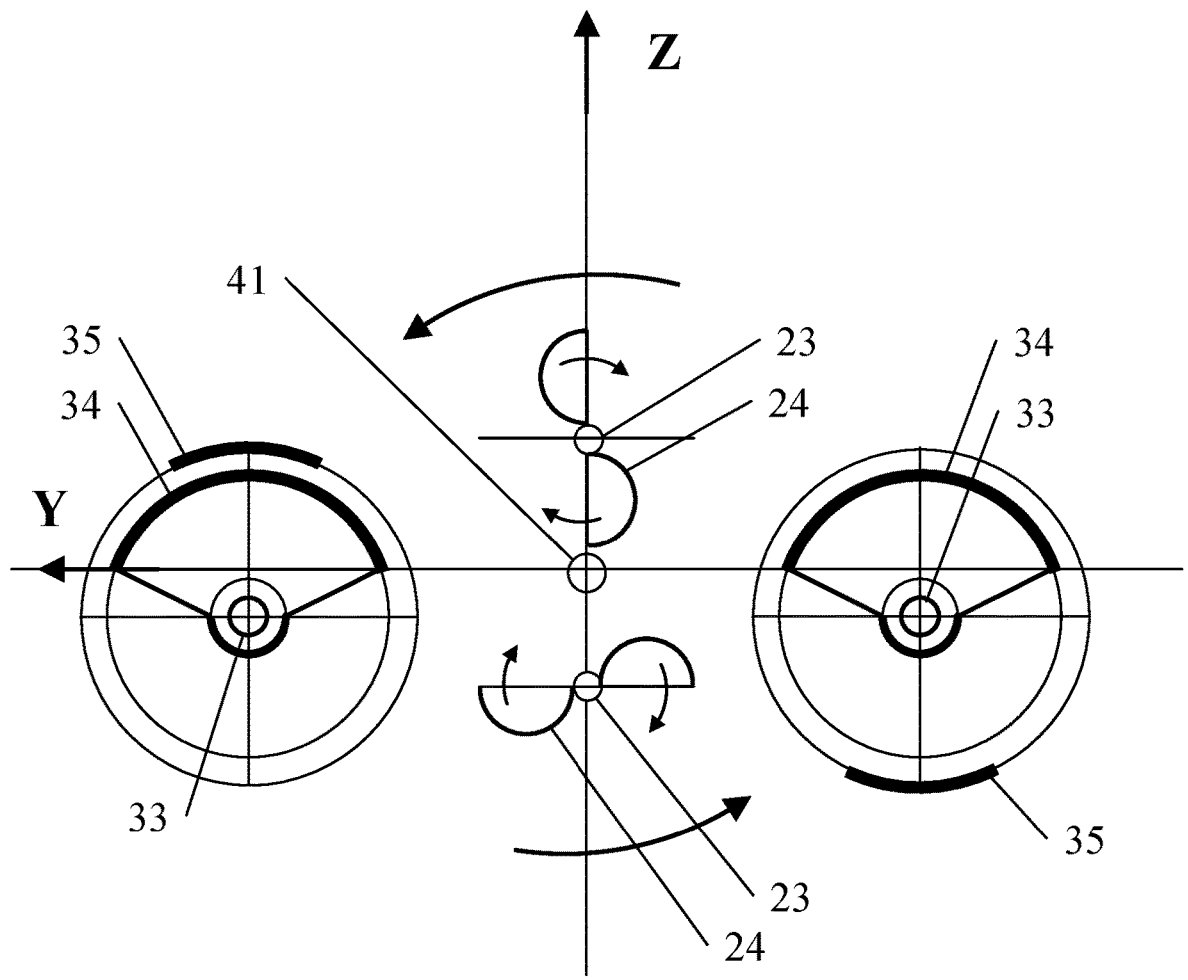
FIG. 3 is a cross section view taken along line 3-3 shown in FIG. 1.

Referring to FIGS. 1 thru 3, preferred embodiment 1 of the V2 PPRW of the present invention, a propeller driven propulsion engine, is comprised of a sun rotor main-assembly 2, orbited by a planet rotor main-assembly 3, and supported by an end mounting main-assembly 4.

Sun rotor main-assembly 2 is consisted of two sun rotor sub-assemblies 21 mounted on a pair of sun rotor end plates 22. The two sun rotor sub-assemblies 21 are clustered in proximity around and in rotations freely from each other, are rotating clockwise in a frontal view, and are aligned one on top of another vertically on the Z axis. One sun rotor sub-assembly 21 in turn is consisted of one sun rotating shaft 23, two sun airfoils 24, and one pair of sun drive sprockets 25. Sun rotating shaft 23 and two sun airfoils 24 are extended in between pair of sun rotor end plates 22, sun rotating shaft 23 continues to pass through and is mounted by free rotation joints to sun rotor end plates 22, and two sun airfoils 24 are fixed attached along and equally spaced in rotations with sun rotating shaft 23. Further out from the pair of sun rotor end plates 22, sun rotating shaft 23 extends in between and fixed attached to the pair of sun drive sprocket 25. One sun airfoil 24 in a frontal cross section has a curved segment in shape similar to a semi circle for a high drag sun airfoil with a semicircle chord lying on a radial line from sun rotating shaft 23; the curved segment having a radius defined as 1.0*R, and sun airfoil 24 in rotations has the appearance of rotational images of one another. For sun airfoil 24 rotated horizontal in lines parallel to the Y axis on the +Y side, sun airfoil 24 concave surface faces and rotates +Z upward. One sun rotor sub-assembly 21 has the appearance of pipes in profiles.

Planet rotor main-assembly 3 is consisted of two orbiting planet rotor sub-assemblies 31 mounted on a pair of planet rotating end carrier plates 32, with two orbiting planet rotor sub-assemblies 31 equally spaced circumferentially 180 degrees apart and orbiting in counter-rotations freely in close proximity around the two sun rotor sub-assemblies 21. One orbiting planet rotor sub-assembly 31 is in turn consisted of a planet rotating shaft 33, a planet airfoil 34 augmented by a paired flaperon 35, and a pair of planet drive sprockets 36. Planet rotating shaft 33, and planet airfoil 34 augmented by paired flaperon 35 extend in between the pair of planet rotating end carrier plates 32, with planet rotating shaft 33 continued passing through and is fixed attached except by rotation joints to the pair of planet rotating end carrier plates 32, planet airfoil 34 is fixed attached along and in rotations with planet rotating shaft 33, paired flaperon 35 is fixed attached to and rotates with planet rotating end carrier plates, and planet airfoil 34 augmented by paired flaperon 35 rotate around one another. Further out from the pair of planet rotating end carrier plates 32, planet rotating shaft 33 extends in between and is fixed attached to the pair of drive sprocket 37. Planet airfoil 34 in a frontal cross section view is a curved segment having a shape similar to a large portion of a semi-circle curved segment for a high lift and drag hybrid airfoil with a radius substantially greater than 1.0*R and a chord width substantially wider than sun airfoil 24 chord width. Planet airfoils 34 concave surfaces in rotations persistently face −Z downward. Planet airfoil 34, when its curved segment chord is rotated horizontal on the Y axis, has its curved segment center line, which is the planet rotating shaft 33, below the Y axis. Planet airfoil 34 rotating with planet rotor sub-assemblies 31 is translational images in orbital rotations around paired sun rotor sub-assemblies 21. Paired flaperon 35 in a frontal cross section view is a smaller circular segment than planet airfoil 34 with a radius slightly greater than the radius of planet airfoil 34, is concentric to its paired planet airfoil 34 for sharing the same planet rotating shaft 33 as their curved segment center lines. Paired flaperon 35 curved segment chord rotated on a line parallel to and above the −Y axis is centered on a radial line from planet rotating shaft 33 parallel to the Z axis. Paired flaperon 35 rotating with planet rotor sub-assemblies 31 is rotational image of one another in rotations around and augmenting the persistently −Z facing planet airfoil 34; and the augmented paired flaperon 35 retracts and deploys around its paired planet airfoil 34. Planet rotor main-assemblies 3 shown in pipe profiles along X axis is represented by centerlines of planet rotor sub-assemblies 31 in orbital rotations around sun rotor main-assemblies 2. One planet rotor main-assembly 3 and each of two orbiting planet rotor sub-assemblies 31 have appearances of pipes in profiles.

The end mounting main-assembly 4 is consisted of one stationary central shaft 41, one pair of grounding plates 42, and one pair of gear box and drive assemblies 43. Stationary central shaft 41 extends in between, passes through, and is fixed attached to pair of sun rotor end plates 22 supporting sun rotating shafts 23 of two sun rotor sub-assemblies 21. Beyond the pair of sun rotor end plates 22, stationary central shaft 41 extends in between and passes through and is fixed attached except by rotational joints to the pair of planet rotating end carrier plates 32 of two planet rotor sub-assemblies 31. Further beyond, stationary central shaft 41 extends in between and is fixed attached to the pair of grounding plates 42. Straddling in between and across one adjacent sun rotor end plate 22 and one planet rotating end carrier plate 32, the pair of gear box and drive assemblies 43 are fixed mounted on and being an integral part of stationary central shaft 41 in extending between the pair of rotor end plates 22 and the pair of planet rotating end carrier plates 32.

Preferred embodiment 1 of the present invention of the V2 PPRW is further comprised of a power and control assembly for powering and controlling of preferred embodiment 1. Gear box and drive chain assembly 43 connects sun rotor main-assembly 2 and planet rotor main-assembly 3 through sun drive sprockets 25 and planet drive sprockets 36 to the power and control assembly for power and transmission controls. Preferred embodiment 1 also has other means and provisions, such as flow gates, diverters, ducts, and funnels as appropriate for shaping air flow patterns of interacting sun airfoils 27 and planet airfoils 35. These and other means and provisions required for preferred embodiment 1 are neither novel nor unique, and are not further described.

In operations, refer particularly to FIG. 4 of a frontal schematic motion view of preferred embodiment 1 of V2 PPRW of the present invention, a propeller driven propulsion engine. Gear box and drive chain assembly 43 connects and transmits powers to sun drive sprockets 25 and planet drive sprockets 36 of preferred embodiment 1, and setting in motions sun rotor main-assembly 2, orbited by planet rotor main-assembly 3, and supported by end mounting main-assembly 4. Two orbiting planet rotor sub-assemblies 31 and their planet airfoil 34 augmented by paired flaperon 35 are in counter-rotations orbiting freely around two sun rotor sub-assemblies 21 and their sun airfoils 24. Planet airfoil 34 augmented by paired flaperon 35 functions as a combined planet airfoil with planet airfoil 34 the primary planet airfoil augmented by paired flaperon 35. In one orbital rotations as shown in FIG. 4, paired flaperon 35 retracts and deploys around its paired planet airfoil 34 in 90 degree counter-rotation increments from −Y axis to +Z axis to +Y axis to −Z axis and back to −Y axis.

Sun airfoils 24 rotating with two sun rotor sub-assemblies 2 alone with planet rotor sub-assemblies 3 removed are wind generators in drawing airflows in from the pipe ends and propelling the airflows radially and tangentially out of the pipe into a contoured pattern of swirling airflow velocity field surrounding two sun rotor sub-assemblies 2, producing rotational drag thrust forces only, but neither translational drag nor lift forces. Sun airfoils 24 in rotations with one sun rotor sub-assembly 2 propel air clockwise and producing a swirling airflow field in a shape of a circle. Sun airfoils 24 in rotations with two sun rotor sub-assemblies 2, one on top vertically of another on Z-axis, produce a swirling airflow field shape that is a stretched oblong circle of two merged circles on Z-axis.

Planet airfoil 34 augmented by paired flaperon 35 are counter-rotating at a given velocity travelling in part as rotary wings through the pattern of contoured swirling airflow velocity field to greatly affect the relative airflow velocities of planet airfoil 34 augmented by paired flaperon 35. The horizontal sideway Y-axis components of the resultant relative airflow velocities of opposing airflows are combined and are greatly increased to greatly amplify +Z lift forces, reaching maximum relative airflow velocities and amplified +Z lift forces when planet airfoil 34 augmented by paired flaperon 35 are rotated to top and bottom on +/−Z axis. The vertical up and down Z-axis components of the resultant relative airflow velocity of opposing and same airflows are combined and are greatly increased and decreased to greatly amplify and decrease +/−Z drag forces, reaching maximum and minimum relative airflow velocities and amplified and decreased +/−Z drag forces when planet airfoil 34 augmented by paired flaperon 35 are rotated to the right and left side on −/+Y axis. The combined +Z lift and drag forces are thrust forces propelled in directions transversely through and across the pipe profile, and when vectored, are turned into variable thrust forces. Embodiment 1 of V2 PPRW of the present invention, with the planet airfoils 34 augmented by paired flaperons 35 rotating in part as rotary wings, is applicable for propeller propulsion for all propeller driven aircrafts, and as fixed wing replacements for fixed wing and tilt rotor aircrafts.

V2 PPRW, a propeller driven propulsion engine, produce great propulsion performances by shaping airflow fields of sun airfoils 24 and changing relative velocities of interacting sun airfoils 24 and planet airfoils 34 augmented by paired flaperons 35. The propulsion performances are overwhelmingly dominated by the performances of high lift and drag hybrid planet airfoils 34 augmented by paired flaperons 35, rotating in part as rotary wings, and having much larger planet airfoils orbiting at a much greater radius than sun airfoils in generating propelled air for lift and drag +Z forces, with lift +Z forces overwhelmingly dominate the drag forces. Sun and planet airfoils, interacting in rotations, propel air for lift and drag +Z forces transversely through and across the pipe profiles along the length of the V2 PPRW. When vectored, the total propelled +Z thrust forces, a combination of +Z lift and drag forces, are turned into variable thrust forces in variable directions for aircraft takeoffs, landings, and air flights.

The preferred embodiment described above is for the purpose of describing features and technical conceptions of a simplified V2 PPRW of the present invention, a propeller driven propulsion engine in a pipe profile. But it should be readily apparent that the invention is not limited to the described preferred embodiment alone, and a person skilled in the art may come up with various changes and modifications consistent to the technical concept disclosed herein and within the spirit and scope of the invention. Prime examples of modifications and optimizations to the described preferred embodiment include: the numbers and sizes of planet and sun rotors main-assemblies and sub-assemblies; the shapes, sizes, center points, numbers, and types (lift, drag, or hybrid) of planet and sun airfoils and flaperons; high lift and drag hybrid planet airfoils assembled from segmented main body, leading edge slats, and trailing edge flaperons; reorienting the V2 PPRW direction from forward-aft to sideways; and inclusions of such provisions as airflow gates, diverters, ducts, and funnels for shaping airflow patterns. Where stated, "air" and "airflow" are broadly meant to be of any fluid medium, including water; and "aircraft" is broadly meant to be vehicles in any fluid medium, including water. Required means, provisions, and systems for powering and vectoring propelled thrust forces—such as power motors and engines, transmission, fuel, mechanisms, and controls systems—that are neither novel nor unique systems, are not described in detail for the preferred embodiment of the present invention. Therefore, it is to be understood that modifications and variations may be utilized without departure from the spirit and scope of the invention disclosed herein, as those skilled in the art will readily understand. Such modifications and variations are considered to be within the purview and scope of the claimed invention and their equivalents.

I claim:

1. A V2 Pipe Prop Rotary Wing (PPRW) having a propeller driven propulsion engine, comprising:
a sun rotor main-assembly, orbited by a planet rotor main-assembly, and supported by an end mounting main-assembly, wherein:
a) the sun rotor main-assembly having a plurality of sun rotor sub-assemblies mounted on a pair of sun rotor end plates; the plurality of sun rotor sub-assemblies clustered in proximity around and configured to rotate freely relative to each other, and the plurality of sun rotor sub-assemblies each rotate in the same direction;
   each of the plurality of sun rotor sub-assemblies comprising: one sun rotating shaft mounted on a pair of sun drive sprockets and a plurality of sun airfoils; the sun rotating shaft and the plurality of sun airfoils extending in between the sun rotor end plates, the sun rotating shaft passing through and attached by free rotation joints to the sun rotor end plates, and the plurality of sun airfoils equally spaced around the sun rotating shaft; the sun rotating shaft extending from the pair of sun rotor end plates out between and fixed to the sun drive sprocket; each of the plurality of sun airfoils having a curved segment in shape providing a high drag sun airfoil with a semicircle chord lying on a radial line from the sun rotating shaft; the curved segment having a radius defined as $1.0*R$ with a concave surface configured to rotate into the surrounding air;
b) the planet rotor main-assembly has a plurality of orbiting planet rotor sub-assemblies mounted on a pair of planet rotating end carrier plates; the plurality of orbiting planet rotor sub-assemblies equally spaced circumferentially and configured to orbit in a direction opposite to a rotation of the plurality of sun rotor sub-assemblies;
   each of the plurality of orbiting planet rotor sub-assemblies comprising: a planet rotating shaft mounted on a pair of planet drive sprockets, a planet airfoil, and a flaperon; the planet rotating shaft, the planet airfoil, and the flaperon extending in between the pair of planet rotating end carrier plates; the planet rotating shaft attached by rotating joints to the pair of planet rotating end carrier plates, the planet airfoil configured to rotate with the planet rotating shaft, and the flaperon configured to rotate with the planet rotating end carrier plates; the planet airfoil having a curved segment of a semi-circle providing a hybrid high lift and drag planet airfoil with a radius substantially greater than $1.0*R$ and a chord width substantially wider than the sun airfoil chord width; the flaperon having a semi-circle shaped segment, nested closely with the planet airfoil, having approximately the same radius as of the planet airfoil, and configure to rotate around the sun rotor ma in-assembly; the flaperon configured to rotate concentrically with the planet airfoil and sharing a centerline of rotation with the planet rotating shaft, the paired flaperon configured to retract and deploy; and
c) the end mounting main-assembly having one stationary central shaft, one pair of grounding plates, and one pair of gear box and drive assemblies; the stationary central shaft attached to the pair of sun rotor end plates and supporting the sun rotating shafts of the plurality of sun rotor sub-assemblies; the stationary central shaft providing rotational support at a location distal to the sun rotor end plates to the pair of planet rotating end carrier plates of the plurality of planet rotor sub-assemblies; the stationary central shaft attached to the pair of grounding plates; the pair of gear box and drive assemblies mounted on the stationary central shaft in between the pair of sun rotor end plate and the pair of grounding plates;.

2. The V2 Pipe Prop Rotary Wing of claim 1 comprises:
a power transmissions and controls system connected in between the gear box and drive chain assembly and the sun drive sprockets and the planet drive sprockets; being powered, the power transmissions and controls system being configured to power and set in motion the plurality of orbiting planet rotor sub-assemblies around the plurality of sun rotor sub-assemblies with the sun airfoils; the sun airfoils configured to rotate with the plurality of sun rotor sub-assemblies in a pipe profile drawing airflow in from pipe ends and propelling the airflow radially and tangentially out of the pipe into a pattern of contoured swirling airflow surrounding the plurality of sun rotor sub-assemblies; the planet airfoil augmented by the paired flaperon by counter-rotating and transitioning through the pattern of contoured swirling airflow; the planet airfoil and paired flaperon configured to provide net drag forces aligned with the lift forces; and the lift and drag forces are combined into thrust forces and propelled in directions transversely through and across the pipe profile.

* * * * *